US012181120B2

(12) United States Patent
Yu

(10) Patent No.: US 12,181,120 B2
(45) Date of Patent: Dec. 31, 2024

(54) ILLUMINATION MODULE

(71) Applicant: Qisda Corporation, Taoyuan (TW)

(72) Inventor: Chao-Shun Yu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/637,383

(22) Filed: Apr. 16, 2024

(65) Prior Publication Data

US 2024/0384853 A1 Nov. 21, 2024

(30) Foreign Application Priority Data

May 19, 2023 (TW) ................................ 112118632

(51) Int. Cl.

| | |
|---|---|
| ***F21S 41/00*** | (2018.01) |
| ***F21S 41/125*** | (2018.01) |
| ***F21S 41/20*** | (2018.01) |
| ***F21S 41/36*** | (2018.01) |
| ***F21S 41/675*** | (2018.01) |
| ***F21V 9/20*** | (2018.01) |

(52) U.S. Cl.

CPC ........... *F21S 41/675* (2018.01); *F21S 41/125* (2018.01); *F21S 41/285* (2018.01); *F21S 41/36* (2018.01); *F21V 9/20* (2018.02)

(58) Field of Classification Search

CPC . F21V 9/20; F21S 41/675; F21S 41/36; F21S 41/125; F21S 41/285

See application file for complete search history.

(56) References Cited

U.S. PATENT DOCUMENTS

| | | | | |
|---|---|---|---|---|
| 11,447,065 | B2 * | 9/2022 | Kurashige | B60Q 1/549 |
| 2005/0073853 | A1 | 4/2005 | Stam | |
| 2020/0351479 | A1 * | 11/2020 | Pan | H04N 9/3161 |
| 2021/0297639 | A1 * | 9/2021 | Pan | H04N 9/3167 |
| 2021/0317967 | A1 | 10/2021 | Won | |
| 2023/0058323 | A1 * | 2/2023 | Sheng | F21S 41/645 |
| 2023/0092879 | A1 | 3/2023 | Haddick | |
| 2023/0266654 | A1 * | 8/2023 | Chen | G03B 21/2066 353/20 |
| 2024/0031538 | A1 * | 1/2024 | Maes | H04N 9/3194 |

FOREIGN PATENT DOCUMENTS

| | | |
|---|---|---|
| CN | 110225846 | 9/2019 |
| CN | 110325402 | 10/2019 |
| CN | 111306505 | 6/2020 |
| CN | 113513734 | 10/2021 |
| CN | 114675479 | 6/2022 |
| TW | 201921055 | 6/2019 |

* cited by examiner

*Primary Examiner* — Gerald J Sufleta, II

(57) ABSTRACT

An illumination module includes a light source, a reflective light valve, a lens, and a diffuser. The light source is configured to emit an illumination beam. The reflective light valve is disposed on a path of the illumination beam, and includes multiple pixels. A pixel in a first state among the pixels is configured to reflect the illumination beam into an effective beam. A pixel in a second state among the pixels is configured to reflect the illumination beam into an auxiliary beam. The lens is disposed on a path of the effective beam, and configured to project the effective beam to an area to be illuminated. The diffuser is configured to diffuse the auxiliary beam from the reflective light valve into a diffused light. The lens is configured to project the diffused light to the area to be illuminated.

20 Claims, 7 Drawing Sheets

ILLUMINATION MODULE

CROSS-REFERENCE TO RELATED APPLICATION

This application claims the priority benefit of Taiwan application serial no. 112118632, filed on May 19, 2023. The entirety of the above-mentioned patent application is hereby incorporated by reference herein and made a part of this specification.

BACKGROUND

Technical Field

The present application relates to an optical module, and more particularly, to an illumination module.

Description of Related Art

With the advancement of optoelectronic technology, an adaptive driving beam (ADB) has been developed in a field of automotive headlight illumination. When an automotive camera senses an oncoming or approaching vehicle or pedestrian, the adaptive driving beam may automatically adjust the light, dimming each of light sources in headlights or moving a beam downward and sideways. In this way, a car driver may always turn on a high beam to provide the best illuminance, and the adaptive driving beam will automatically adjust the beam such that it does not illuminate the oncoming driver.

Currently, the adaptive driving beam has already operated using a digital micro-mirror device (DMD) system. When using this kind of adaptive driving beam, when the automotive camera senses the oncoming vehicle, multiple micro-mirrors of the digital micro-mirror device are turned corresponding to an area facing the oncoming vehicle, resulting in a dark area without illumination in the area. However, regulations in some countries (such as the Federal Motor Vehicle Safety Standard 108 (FMVSS 108) in the United States) do not allow such adaptive driving beam because some dangers may occur if some areas suddenly become unlit. For example, if there is an emergency situation in the unlit area (such as sudden appearance of the pedestrian), the driver will not be able to notice it.

SUMMARY

The present application provides an illumination module which may still provide illumination in the dark area to avoid a situation where sudden situations in the dark area may not be noticed by a driver.

An embodiment of the present application provides an illumination module, including a light source, a reflective light valve, a lens, and a diffuser. The light source is configured to emit an illumination beam. The reflective light valve is disposed on a path of the illumination beam and includes multiple of pixels. Each of the pixels is adapted to switch between a first state and a second state. A pixel in the first state among the pixels is configured to reflect the illumination beam into an effective beam, and a pixel in the second state among the pixels is configured to reflect the illumination beam into an auxiliary beam. The lens is disposed on a path of the effective beam, and is configured to project the effective beam to an area to be illuminated. The diffuser is disposed on a path of the auxiliary beam from the reflective light valve, and is configured to diffuse the auxiliary beam into a diffused light. The lens is also disposed on a path of the diffused light, and is configured to project the diffused light to the area to be illuminated.

In the illumination module according to the embodiment of the present application, the diffuser is adopted to diffuse the auxiliary beam into the diffused light, and the lens is used to project the diffused light to the area to be illuminated. Therefore, the illumination module may still provide illumination in the dark area to avoid the situation where the sudden situations in the dark area may not be noticed by the driver, thereby complying with the regulations in some countries (such as FMVSS 108 in the United States).

DETAILED DESCRIPTION OF DISCLOSED EMBODIMENTS

Figure 1:
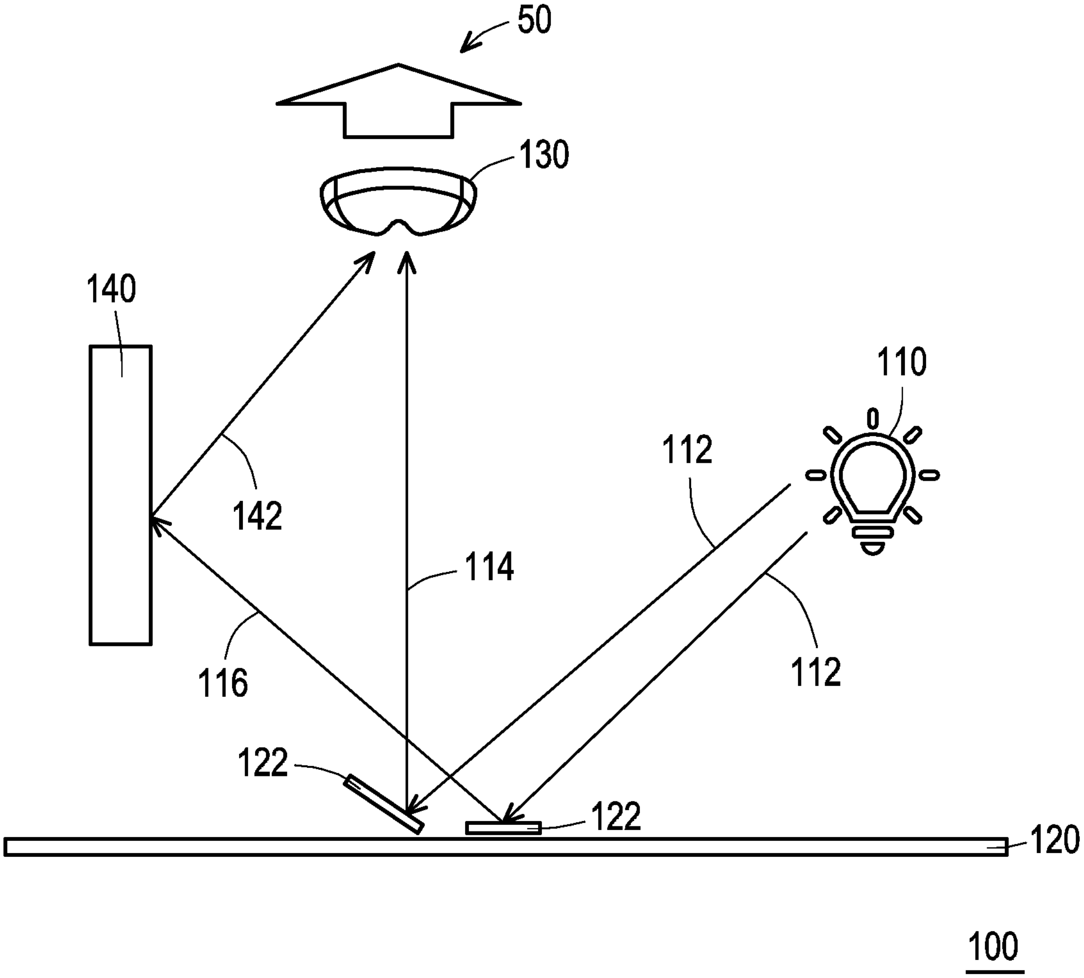
FIG. 1 is a schematic view of a light path of an illumination module according to an embodiment of the present application.

FIG. 1 is a schematic view of a light path of an illumination module according to an embodiment of the present application. Referring to FIG. 1, an illumination module 100 in this embodiment includes a light source 110, a reflective light valve 120, a lens 130, and a diffuser 140. The light source 110 is configured to emit an illumination beam 112. In this embodiment, the light source 110 includes at least one of a light emitting diode, a laser diode, and a gas discharge lamp. The gas discharge lamp may be a high-intensity discharge lamp (HID lamp). The reflective light valve 120 is disposed on a path of the illumination beam 112 and includes multiple pixels 122. FIG. 1 shows two pixels 122 as an example. However, in fact, there may be more pixels 122, and the pixels 122 may form an image frame.

Each of the pixels 122 is adapted to switch between a first state and a second state. The pixel 122 in the first state among the pixels 122 (for example, the pixel 122 on the left in FIG. 1) is configured to reflect the illumination beam 112 into an effective beam 114, and the pixel 122 in the second state among the pixels 122 (for example, the pixel 122 on the right in FIG. 1) is configured to reflect the illumination beam 112 into an auxiliary beam 116.

In this embodiment, the reflective light valve 120 is a digital micro-mirror device (DMD). The pixels 122 are respectively multiple micromirrors. One pixel 122 in the first state indicates that the micromirror of the pixel 122 is rotated to a first angle (for example, the pixel 122 on the left in FIG. 1) to reflect the illumination beam 112 illuminated thereon to the lens 130, another pixel 122 in the second state indicates that the micromirror of the another pixel 122 is rotated to a second angle (for example, the pixel 122 on the right in FIG. 1) to reflect the illumination beam 112 illuminated thereon to the diffuser 140.

The lens 130 is disposed on a path of the effective beam 114, and is configured to project the effective beam 114 to an area 50 to be illuminated. The diffuser 140 is disposed on a path of the auxiliary beam 116 from the reflective light valve 120, and is configured to diffuse the auxiliary beam 116 into a diffused light 142. The lens 130 is also disposed on a path of the diffused light 142, and is configured to project the diffused light 142 to the area 50 to be illuminated. In this embodiment, "diffusion" refers to homogenizing light intensity and expanding an aperture of a beam to reduce average brightness of the beam. In this embodiment, the diffuser 140 is a diffuse reflective plate configured to diffusely reflect the auxiliary beam 116 into the diffused light 142.

In a conventional adaptive driving beam (ADB) using the digital micro-mirror device (DMD), the micromirror of the pixel 122 in the second state (i.e., at the second angle) reflects the illumination beam 112 to a light absorbing element (not shown in the figure), so that the illumination beam 112 may not enter the lens 130 and generate a dark area without illumination in the area 50 to be illuminated. This situation does not comply with the regulations in some countries (such as FMVSS 108 in the United States). In comparison, in the illumination module 100 in this embodiment, the diffuser 140 is adopted to diffuse the auxiliary beam 116 reflected by the pixel 122 in the second state into the diffused light 142, and the lens 130 is used to project the diffused light 142 to the area 50 to be illuminated. Therefore, the illumination module 100 may still provide illumination in the dark area to avoid a situation where sudden situations in the dark area may not be noticed by a driver, thereby complying with the regulations in some countries (such as FMVSS 108 in the United States). In this embodiment, the illumination module 100 is, for example, a headlight of a vehicle. The lens 130 is configured to project the effective beam 114 to a bright area of the area 50 to be illuminated, and to project the diffused light 142 to the dark area of the area 50 to be illuminated or to cover the entire area 50 to be illuminated, or to integrate the diffused light 142 into a low beam to be projected. The bright area refers to an area in the area 50 to be illuminated that has been illuminated by the effective beam 114, and the dark area refers to an area in the area 50 to be illuminated that is not illuminated by the effective beam 114.

In addition, in the conventional technology, a processing method of completely darkening the dark area is adopted. When the adaptive driving beam is in a time difference between multiple spatial distributions switching between one another, the dark area will cause an undetectable blank time zone. In this embodiment, this situation may be avoided by projecting the diffused light 142 to the dark area. Furthermore, when the vehicle is turning, if the oncoming vehicle is a large vehicle, the diffused light 142 may be used for a vehicle body or road conditions behind the vehicle (such as bicycles, road signs, people, etc. behind the vehicle) to generate non-glaring illumination to be noticed by the driver, thereby effectively improving traffic safety.

In addition, compared to the conventional adaptive driving beam (ADB) using the digital micro-mirror device (DMD) in which light energy correspondingly absorbed when the dark area is originally generated will be accumulated in a vehicle lighting system (for example, the light absorbing element), causing a temperature of the vehicle lighting system to rise, thereby reducing service life and reliability of the vehicle lighting system, the illumination module 100 in this embodiment may greatly improve the aforementioned situation because a large proportion of the auxiliary beam 116 is diffused into the diffused light 142 to be projected out of the illumination module 100. In addition, such reuse of the auxiliary beam 116 may also make full use of the light energy of the light source, avoid energy waste, and reduce the temperature of the vehicle lighting system, thereby increasing the service life and reliability of the vehicle lighting system. On the other hand, the method in which the illumination module 100 in this embodiment reuses the auxiliary beam 116 hardly affects a spectrum of the bright area, so that the illumination module 100 may comply with traffic regulations.

On the other hand, in this embodiment, the auxiliary beam 116 is diffused into the diffused light 142 before being projected to the area 50 to be illuminated. Intensity of the diffused light 142 is low and will not cause glare or dazzle to the oncoming vehicle.

Figure 2:
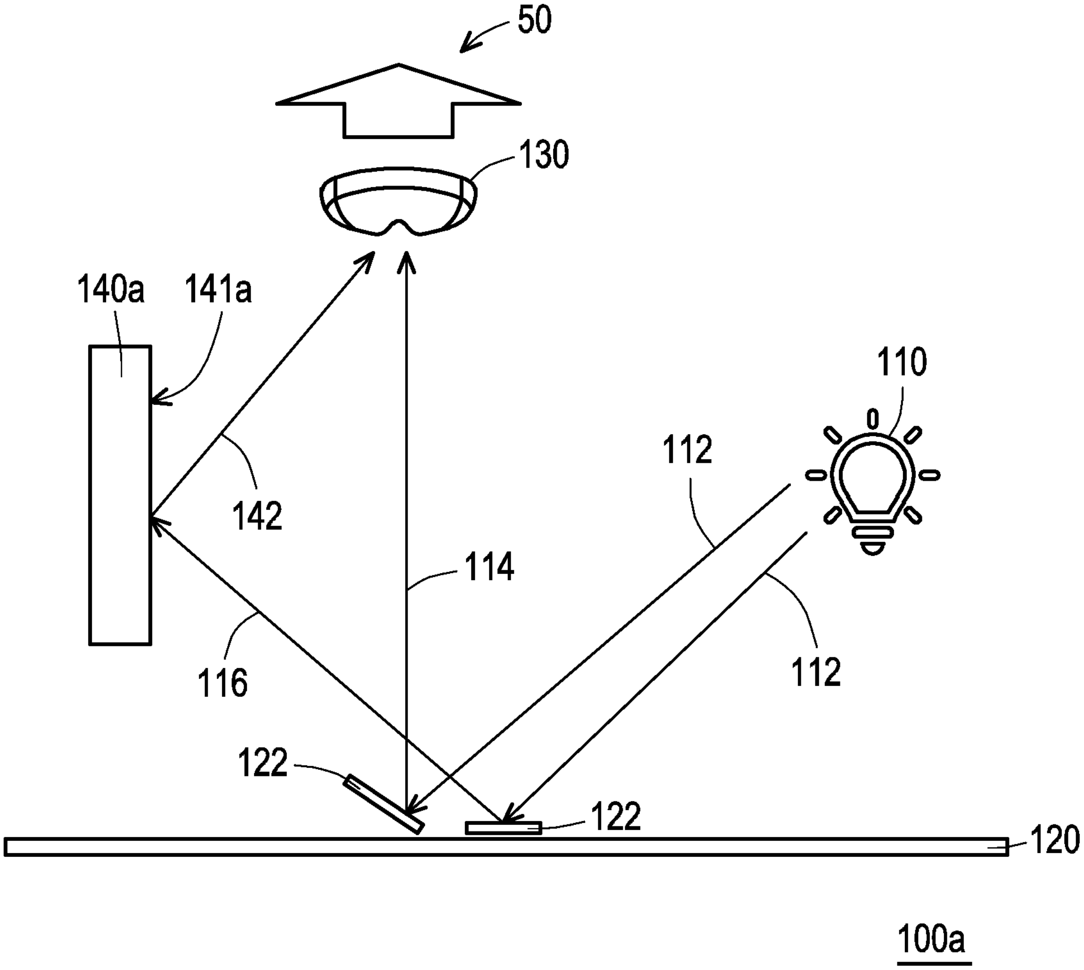
FIG. 2 is a schematic view of a light path of an illumination module according to another embodiment of the present application.

FIG. 2 is a schematic view of a light path of an illumination module according to another embodiment of the present application. Referring to FIG. 2, an illumination module 100*a* in this embodiment is similar to the illumination module 100 in FIG. 1, and differences between the two are as follows. In the illumination module 100*a* in this embodiment, a diffuser 140*a* includes a specific color, so that the diffused light 142 includes the specific color. For example, a diffuse reflective surface 141*a* of the diffuser 140*a* may have a specific color, such as red, yellow, or orange, so that the diffused light 142 becomes red, yellow, or orange. The diffused light 142 may be illuminated on a traffic sign in the dark area or a reflective road sign on a road, and the yellow, orange, or red diffused light 142 may correspond to a color of the traffic sign or reflective road sign, thereby enabling the traffic sign or reflective road sign to be more eye-catching to the driver. The diffused light 142 with the specific color may also be projected to the bright area (i.e., an area where the effective light beam 114 is projected) to enhance illumination of the specific color (such as yellow, orange, or red). However, the disclosure is not limited thereto.

Figure 3:
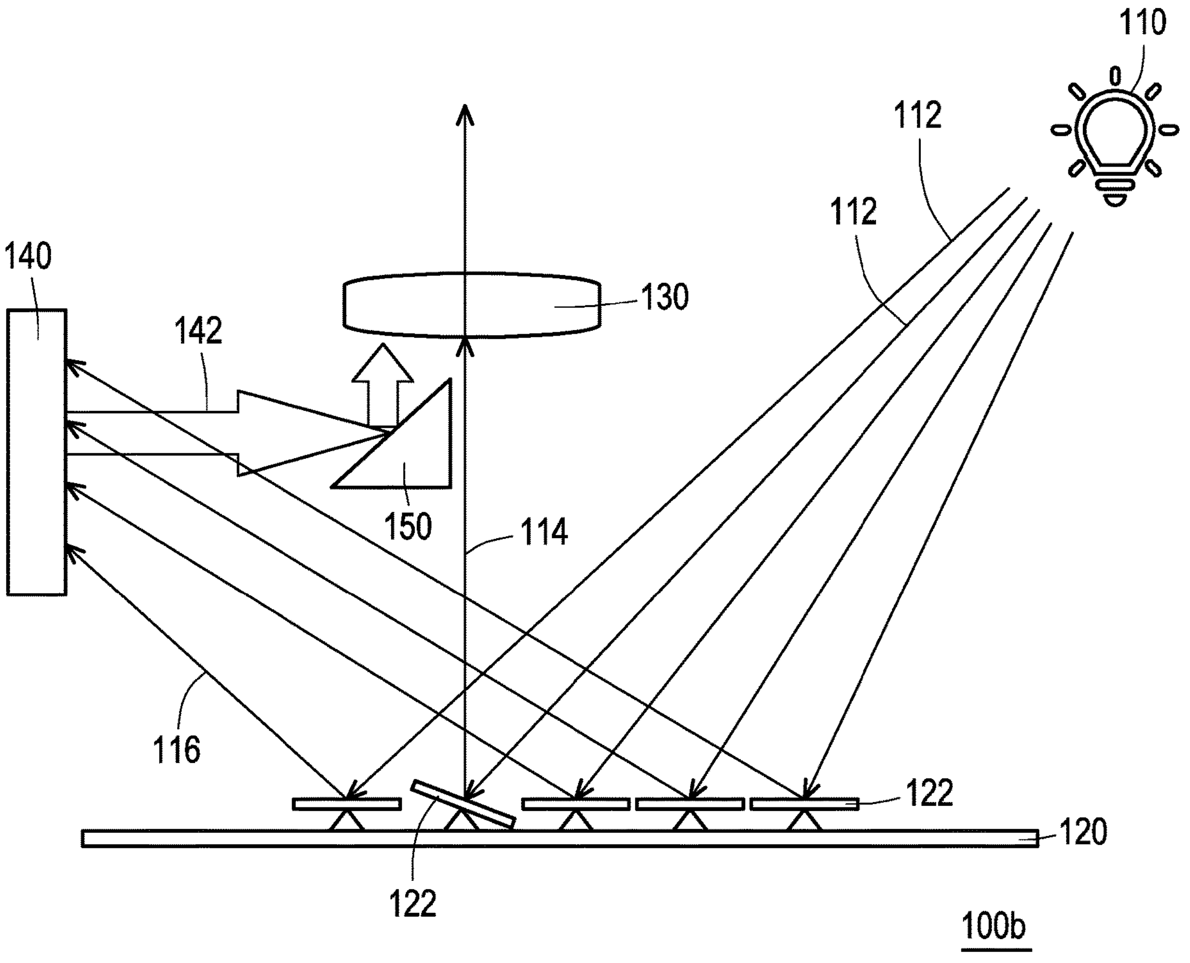
FIG. 3 is a schematic view of a light path of an illumination module according to still another embodiment of the present application.

FIG. 3 is a schematic view of a light path of an illumination module according to still another embodiment of the present application. Referring to FIG. 3, an illumination module 100*b* in this embodiment is similar to the illumination module 100 in FIG. 1, and differences between the two are as follows. The illumination module 100*b* in this embodiment further includes a reflector 150 disposed on the path of the diffused light 142 and configured to reflect at least part of the diffused light 142 to the lens 130.

Figure 4:
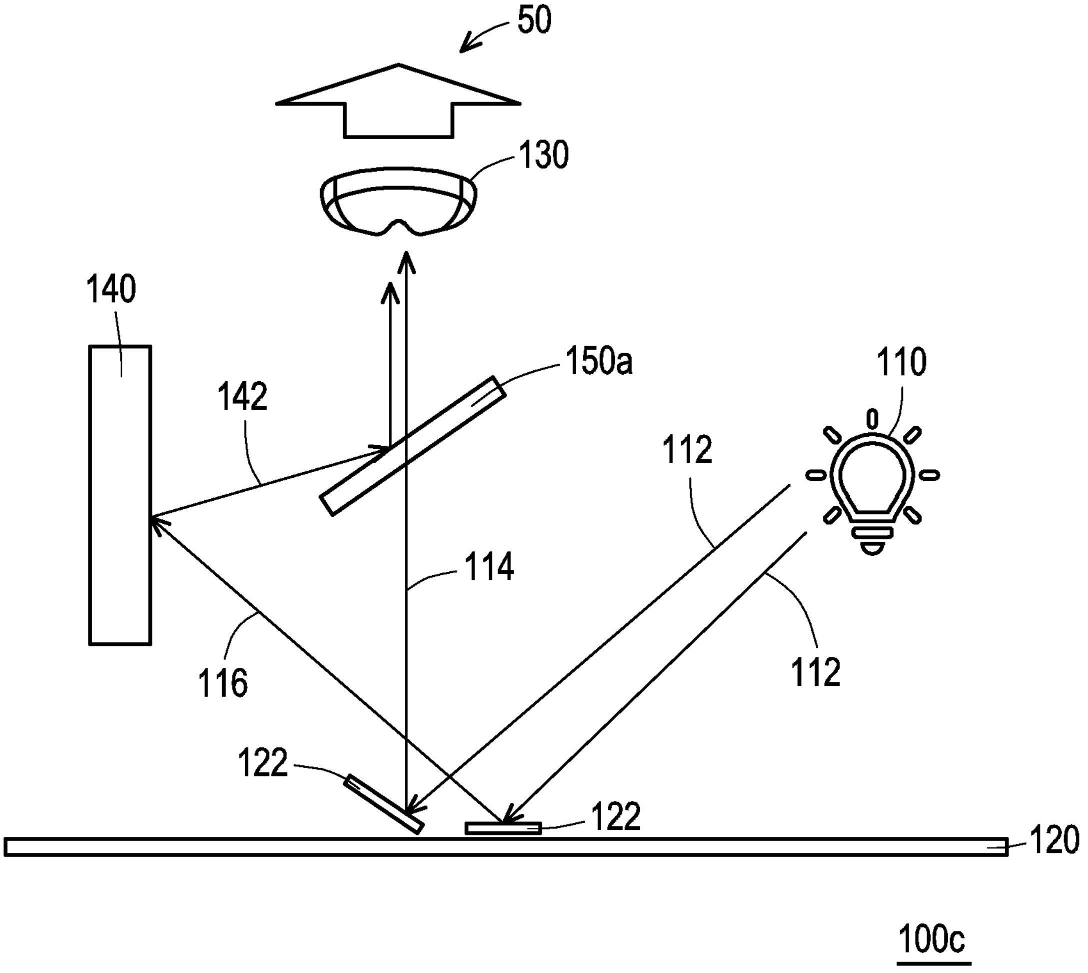
FIG. 4 is a schematic view of a light path of an illumination module according to yet another embodiment of the present application.

FIG. 4 is a schematic view of a light path of an illumination module according to yet another embodiment of the present application. Referring to FIG. 4, an illumination module 100*c* in this embodiment is similar to the illumination module 100 in FIG. 1, and differences between the two are as follows. The illumination module 100*c* in this embodiment further includes a partially transmissive and partially reflective reflector 150*a* (for example, a see-through mirror) disposed on the path of the effective beam 114, located between the reflective light valve 120 and the lens 130, and configured to allow the at least part of the effective beam 114 (for example, half of the effective beam 114) from the reflective light valve 120 to penetrate through to be transmitted to the lens 130. In addition, the partially transmissive and partially reflective reflector 150*a* is also disposed on the path of the diffused light 142, and is configured to reflect the at least part of the diffused light 142 (for example, the half of the diffused light 142) to the lens 130.

Figure 5:
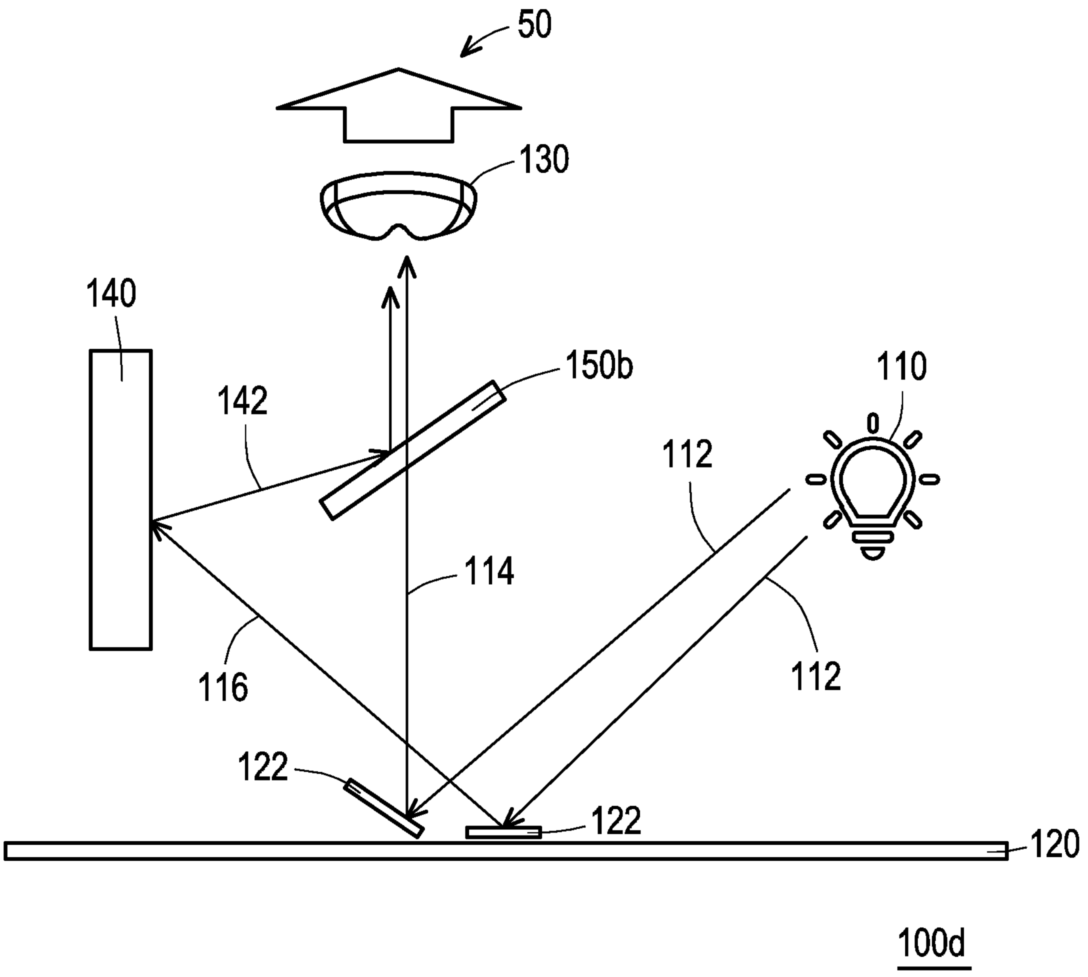
FIG. 5 is a schematic view of a light path of an illumination module according to another embodiment of the present application.

FIG. 5 is a schematic view of a light path of an illumination module according to another embodiment of the present application. Referring to FIG. 5, an illumination module 100*d* in this embodiment is similar to the illumination module 100 in FIG. 1, and differences between the two are as follows. The illumination module 100*d* in this embodiment further includes a dichroic mirror 150*b* disposed on the path of the effective beam 114, located between the reflective light valve 120 and the lens 130, and configured to allow the at least part of the effective beam 114 from the reflective light valve 120 to penetrate through to be transmitted to the lens 130. In addition, the dichroic mirror 150*b* is also disposed on the path of the diffused light 142, and is configured to reflect part of the diffused light 142 with the specific color to the lens 130. In this embodiment, the specific color is red, orange, or yellow. In this way, the diffused light 142 may be illuminated on the traffic sign in the dark area or the reflective road sign on the road, and the yellow, orange, or red diffused light 142 may correspond to the color of the traffic sign or reflective road sign, thereby enabling the traffic sign or reflective road sign to be more eye-catching to the driver. However, the disclosure is not limited thereto.

Figure 6:
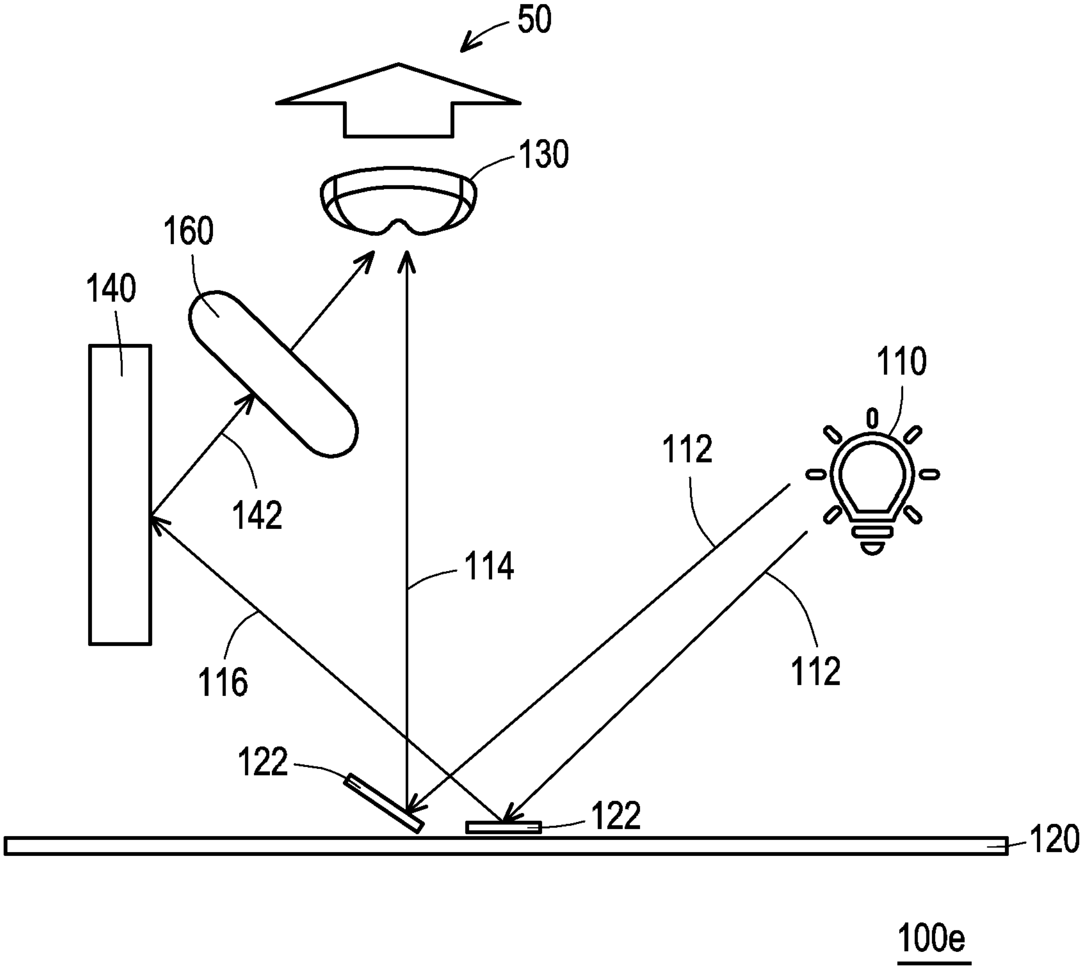
FIG. 6 is a schematic view of a light path of an illumination module according to still another embodiment of the present application.

FIG. 6 is a schematic view of a light path of an illumination module according to still another embodiment of the present application. Referring to FIG. 6, an illumination module 100*e* in this embodiment is similar to the illumination module 100 in FIG. 1, and differences between the two are as follows. The illumination module 100*e* in this embodiment further includes a light filter 160 disposed on the path of the diffused light 142, located between the diffuser 140 and the lens 130, and configured to allow the part of the diffused light 142 with the specific color to penetrate through to be transmitted to lens 130. In this embodiment, the specific color is, for example, red, orange, or yellow. In addition, in this embodiment, the light filter 160 is a light filter film or a color wheel. The color wheel may have filter blocks (not shown in the figure) of different colors, and as the color wheel rotates, the filter blocks of different colors enter the path of the diffused light 142 at different times to achieve filter effects for different colors. However, the disclosure is not limited thereto.

Figure 7:
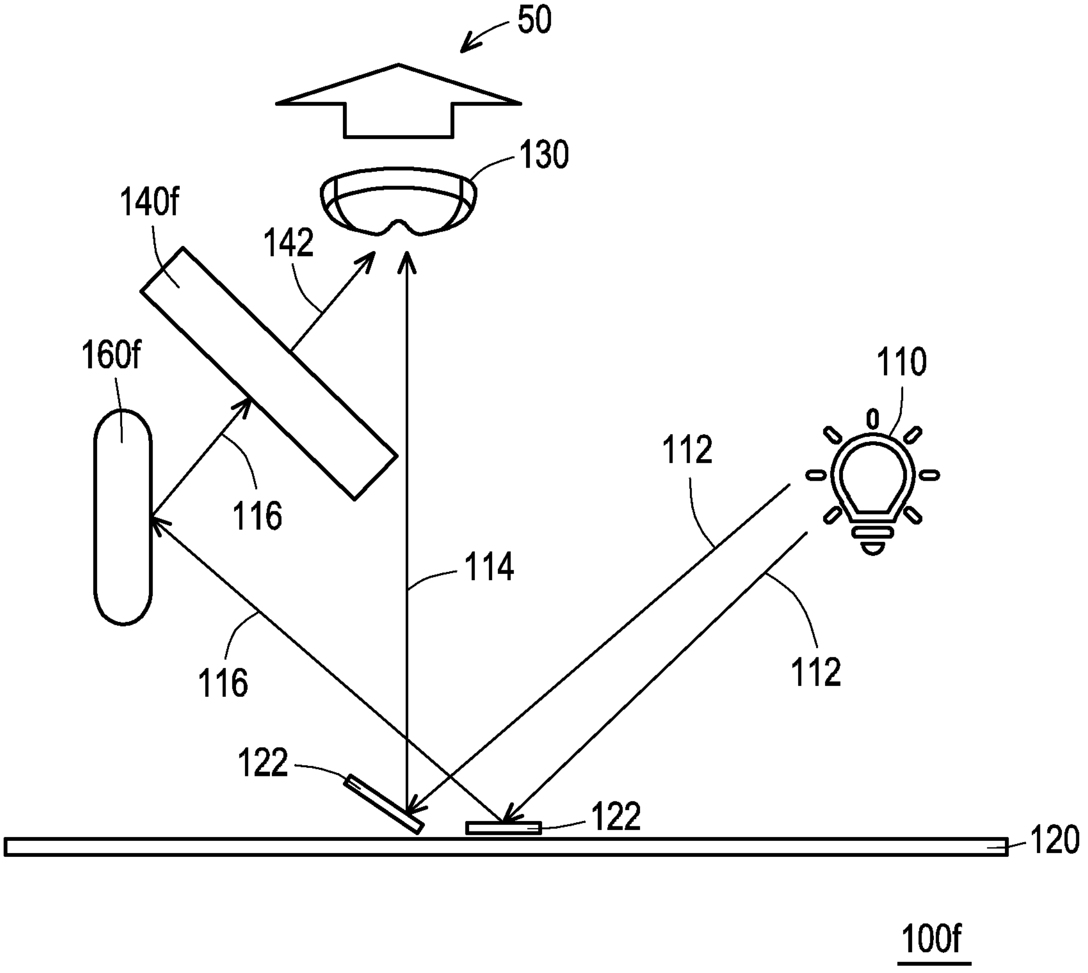
FIG. 7 is a schematic view of a light path of an illumination module according to yet another embodiment of the present application.

FIG. 7 is a schematic view of a light path of an illumination module according to yet another embodiment of the present application. Referring to FIG. 7, an illumination module 100*f* in this embodiment is similar to the illumination module 100 in FIG. 1, and differences between the two are as follows. The illumination module 100*f* in this embodiment further includes a light filter 160*f* disposed on the path of the auxiliary beam 116 from the reflective light valve 120 and located between the reflective light valve 120 and a diffuser 140*f*, so that the part of the auxiliary beam 116 with the specific color is transmitted to the diffuser 140*f*. In this embodiment, the diffuser 140*f* is a transmissive diffuser. In an embodiment, the diffuser 140*f* is a transmissive diffuser with diopter, where having diopter refers to having refractive power. For example, a shape of the diffuser may be any shape of various types of convex lenses or concave lenses, which may converge or diverge the auxiliary beam 116. For example, the diffuser 140*f* may be a fisheye lens. However, the disclosure is not limited thereto.

In addition, the light filter 160*f* is, for example, a light filter film, a color wheel, or a dichroic mirror, and the above specific color is, for example, red, orange or, yellow. However, the disclosure is not limited thereto.

Based on the above, in the illumination module according to the embodiment of the present application, the diffuser is adopted to diffuse the auxiliary beam into the diffused light, and the lens is used to project the diffused light to the area to be illuminated. Therefore, the illumination module may use the non-dazzling diffused light to still provide illumination in the dark area to avoid the situation where the sudden situations in the dark area may not be noticed by the driver, which effectively improves the traffic safety, and complies with the regulations in some countries (such as FMVSS 108 in the United States). Furthermore, the illumination module in the embodiment of the present application may fully utilize the light energy of the light source, which not only avoids energy waste, but also reduces the temperature of the vehicle lighting system, thereby increasing the service life and reliability of the vehicle lighting system.

It is worth mentioning that the color of the diffused light in the embodiment of the present application may further correspond to the color of the traffic sign or reflective road sign, thereby enabling the traffic sign or reflective road sign to be more eye-catching to the driver and enhancing a warning effect to the driver.

What is claimed is:

1. An illumination module, comprising:

a light source configured to emit an illumination beam;

a reflective light valve disposed on a path of the illumination beam and comprising a plurality of pixels, wherein each of the pixels is adapted to switch between a first state and a second state, a pixel in the first state among the pixels is configured to reflect the illumination beam into an effective beam, and a pixel in the second state among the pixels is configured to reflect the illumination beam into an auxiliary beam;

a lens disposed on a path of the effective beam and configured to project the effective beam to an area to be illuminated; and a diffuser disposed on a path of the auxiliary beam from the reflective light valve and configured to diffuse the auxiliary beam into a diffused light, wherein the lens is also disposed on a path of the diffused light, and is configured to project the diffused light to the area to be illuminated.

2. The illumination module according to claim 1, wherein the diffuser is a diffuse reflective plate to diffusely reflect the auxiliary beam into the diffused light.

3. The illumination module according to claim 1, wherein the diffuser comprises a specific color, so that the diffused light comprises the specific color.

4. The illumination module according to claim 1, further comprising a reflector disposed on the path of the diffused light and configured to reflect at least part of the diffused light to the lens.

5. The illumination module according to claim 1, further comprising a partially transmissive and partially reflective reflector disposed on the path of the effective beam, located between the reflective light valve and the lens, and configured to allow at least part of the effective beam from the reflective light valve to penetrate through to be transmitted to the lens, wherein the partially transmissive and partially reflective reflector is also disposed on the path of the diffused light, and is configured to reflect at least part of the diffused light to the lens.

6. The illumination module according to claim 1, further comprising a dichroic mirror disposed on the path of the effective beam, located between the reflective light valve and the lens, and configured to allow at least part of the effective beam from the reflective light valve to penetrate through to be transmitted to the lens, wherein the dichroic mirror is also disposed on the path of the diffused light, and is configured to reflect part of the diffused light with a specific color to the lens.

7. The illumination module according to claim 6, wherein the specific color is red, orange, or yellow.

8. The illumination module according to claim 1, further comprising a light filter disposed on the path of the diffused light, located between the diffuser and the lens, and is configured to enable part of the diffused light with a specific color to penetrate through to be transmitted to the lens.

9. The illumination module according to claim 8, wherein the light filter is a light filter film or a color wheel.

10. The illumination module according to claim 8, wherein the specific color is red, orange, or yellow.

11. The illumination module according to claim 1, further a light filter disposed on the path of the auxiliary beam from the reflective light valve and located between the reflective light valve and the diffuser, so that part of the auxiliary beam with a specific color is transmitted to the diffuser.

12. The illumination module according to claim 11, wherein the diffuser is a transmissive diffuser.

13. The illumination module according to claim 11, wherein the diffuser is a fisheye lens.

14. The illumination module according to claim 11, wherein the diffuser is a transmissive diffuser with diopter.

15. The illumination module according to claim 11, wherein the light filter is a light filter film, a color wheel, or a dichroic mirror.

16. The illumination module according to claim 11, wherein the specific color is red, orange, or yellow.

17. The illumination module according to claim 1, wherein the reflective light valve is a digital micro-mirror device, the pixels are respectively a plurality of micromirrors, one pixel in the first state indicates that the micromirror of the pixel is rotated to a first angle to reflect the illumination beam illuminated thereon to the lens, and another pixel in the second state indicates that the micromirror of the another pixel is rotated to a second angle to reflect the illumination beam illuminated thereon to the diffuser.

18. The illumination module according to claim 1, wherein the light source comprises at least one of a light emitting diode, a laser diode, and a gas discharge lamp.

19. The illumination module according to claim 1, wherein the illumination module is a headlight of a vehicle.

20. The illumination module according to claim 19, wherein the lens is configured to project the effective beam to a bright area of the area to be illuminated, and configured to project the diffused light to a dark area of the area to be illuminated or to cover an entire area.

* * * * *